Dec. 11, 1945.  N. C. THOMPSON ET AL  2,390,855
WELDING MACHINE FOR FIN-TUBES
Filed March 4, 1944
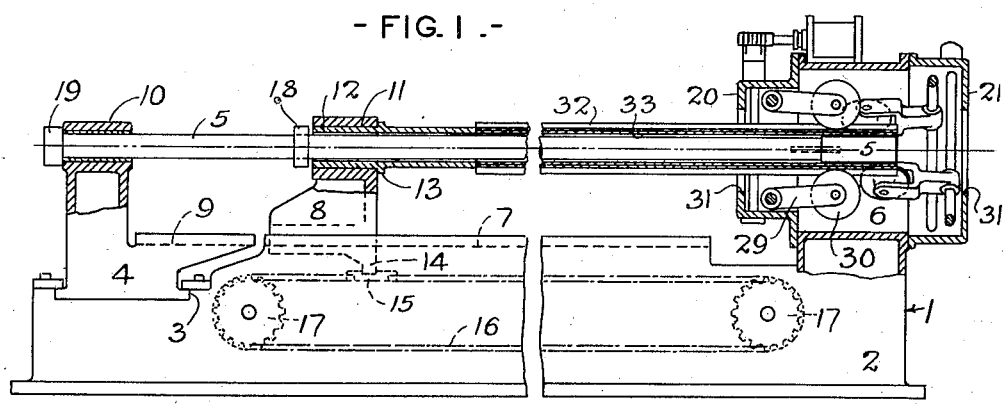
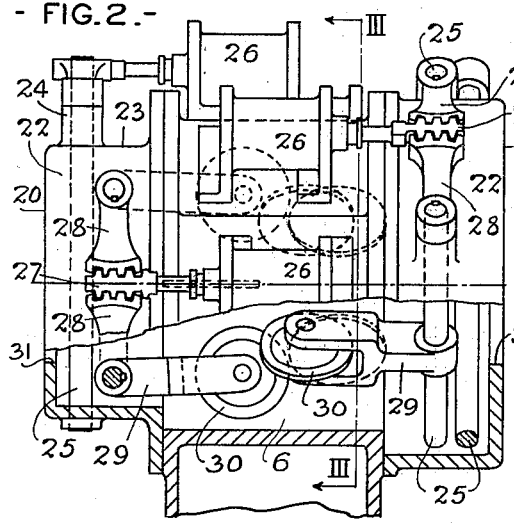
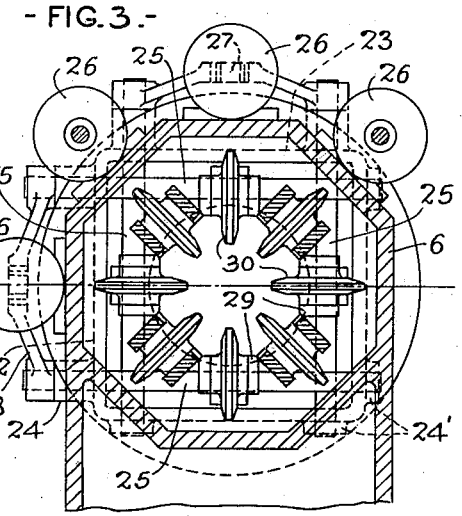
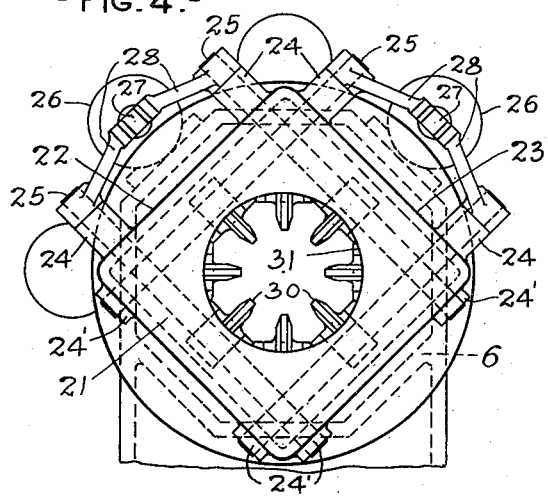
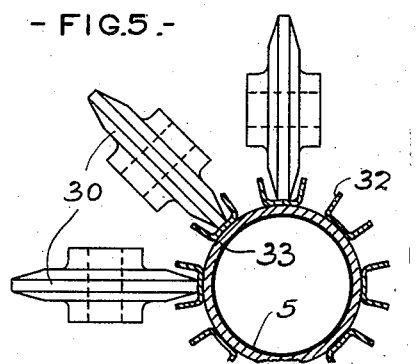
INVENTORS — Norman C. Thompson
Addison Y. Gunter
Wilbur A. Shaw
Walter E. Roe, deceased
by Viola B. Roe, Administratrix.
BY
S. C. Yeaton
ATTORNEY Patented Dec. 11, 1945

2,390,855

UNITED STATES PATENT OFFICE 2,390,855

WELDING MACHINE FOR FIN TUBES

Norman C. Thompson, Auburn, Addison Y. Gunter, Larchmont, Wilbur A. Shaw, Forest Hills, and Walter E. Roe, deceased, late of Kirkland, N. Y., by Viola B. Roe, administratrix, Clinton, N. Y., assignors to American Locomotive Company, New York, N. Y., a corporation of New York Application March 4, 1944, Serial No. 525,128

6 Claims. (Cl. 78—90)

This invention relates to a machine for pressure-welding fins to a tube.

It is well-known practice to form heat exchanger fin-tubes by welding fin brackets to a tube, a fin bracket being a strip, channel-shaped in cross section, providing two fins connected by a base. For instance, it is well known to resistance-weld the base to the tube, see U. S. patent to Brown, No. 2,261,137, November 4, 1941. However, it has been found that pressure-welding is more economical than other types of welding, and has other advantages. By pressure-welding is meant welding two pieces of metal together by heating them to a suitable welding temperature and then forcing them together with sufficient pressure to form a bond therebetween, pressure-welding thereby being somewhat similar to forge-welding.

The object of the present invention is to provide a machine for pressure-welding fins to a tube, and more particularly fin brackets having at least a base and a fin portion at substantially right angles thereto.

Referring to the accompanying drawing forming a part of this application, Figure 1 is a side view of the machine of the present invention, partly in elevation and partly in section, a sprocket chain being indicated in dot and dash lines; Fig. 2 is an enlarged side view of the multiple roller head of the machine of Fig. 1, partly in elevation and partly in section; Fig. 3 is a section on the line III—III of Fig. 2, parts being shown in full; Fig. 4 is an end view taken from the right of Fig. 2; and Fig. 5 is a further enlarged view, partly in section, showing three rollers and the mandrel in position for welding fin brackets to a tube, some of the brackets being broken away.

The machine comprising the present invention is indicated in the drawing generally by the reference numeral 1. It includes a base 2 having a cross guide 3 at its rear end in which is slidably mounted a cross slide or support 4 for a mandrel 5, and a fixed multiple roller head housing 6 at its front end octagonal in cross section, see Fig. 3. The mandrel 5 is shown as of solid construction. However, it may be provided, if desired, with a passage or passages (not shown) for the circulation therethrough of a cooling medium such as water. A longitudinal guide 7, in which is slidably mounted a pusher 8, is formed in the base 2 and a similar shorter guide 9 is formed in the support 4.

The support 4 extends upwardly and has a bearing 10 for the rear end of the mandrel. Suitable mechanism, not shown, such as a transverse rack or screw, may be provided for moving support 4 transversely and stops may be provided for holding it in desired transverse positions, as for proper alignment of the mandrel with the tube to which the fins are to be welded, or it may be moved manually if desired.

The pusher 8 extends upwardly and is provided at its upper end with an orifice 11 in which is disposed a sleeve 12 in alignment with bearing 10, sleeve 12 having a flange 13 bearing against the front face of the pusher 8, the sleeve acting as a backer for the tube. A finger 14 depends from the front of the pusher and engages a slot in a member 15 carried by a chain 16 (indicated in do and dash lines in Fig. 1), the chain being mounted on sprockets 17 journalled in the base 2 and driven in any well-known manner (not shown)

A collar 18 is fastened on the mandrel 5 between the pusher 8 and support 4, as by a set screw (not shown), and another collar 19 is similarly fastened on the mandrel to the rear of the bearing 10. The mandrel extends forwardly from the collar 19 through the sleeve 12 and has a free end in the housing 6 which is enlarged to support the tube, the diameter of the enlarged end depending upon the size of the tube to be operated on.

A square casing 20 is secured to the rear of the housing 6 with its four sides parallel respectively with four alternate sides of the housing 6. A similar casing 21 is secured to the front of the housing 6 but rotated clockwise 45 degrees from the casing 20 so that its four sides are parallel respectively with the four remaining sides of the housing. Casings 20 and 21 are similar and therefore only the casing 21 will be described, similar parts of casings 20 and 21 being indicated by the same reference numerals.

Casing 21 is disposed with its side faces inclined 45 degrees, see Fig. 4, and as so disposed, has a left top face 22 and a right top face 23. Casing 20 is disposed with its pairs of side faces respectively vertical and horizontal, and therefore only has a single top face, which face corresponds with face 23. Two bosses 24 extend outwardly perpendicular to each of the faces 22 and 23, each boss being in alignment with another boss 24' on the casing opposite face. A shaft 25 is journalled in each pair of aligned bosses 24 and extends beyond its boss 24.

A fluid-actuated (hydraulic or compressed air) cylinder 26 is supported on each of the housing faces parallel and adjacent to the faces 22 and 23 of the casing 21 centrally transversely of these housing faces. The piston rod of each cylinder extends toward casing 21 intermediate the bosses 24 adjacent thereto and terminates in a rack 27 having teeth on both sides in mesh with segment-toothed arms 28 secured to the adjacent ends of shafts 25 which are parallel to each other. There are two other cylinders similarly associated with the shaft 25 of casing 20, and all four cylinders will have a common control (not shown) to actuate them simultaneously.

Within casing 20 and 21 a bifurcated arm 29 is secured to each shaft 25 and extends into housing 6, and has journalled thereon between the branches of the furcation, a pressure-welding roller 30. As there are eight shafts, there are eight rollers and they are arranged radially of the center of the housing 6, one perpendicular to each of the sides of the octangular wall of the housing. An opening 31 is provided in the rear wall of casing 20 and the front wall of casing 21, for a purpose presently to appear. It is contemplated that the rollers 30 may be cooled, if desired, by providing passages (not shown) in the shafts 25, arms 29, rollers 30 and pins journalling the rollers 30 on the arms 29, the passages being for the circulation of a cooling medium such as air, water or oil.

The machine 1 is for pressure-welding fin brackets 32 to a tube. 33. The operation of the machine is as follows:

The pusher 8 is slid onto the guide 9 and the support 4 is moved transversely to the side of the base 2 out of line with the housing 6, finger 14 sliding in the slot in member 15, which will then be on top of the rear sprocket 17 at the left of Fig. 1. The pusher 8, by engagement with the collar 18 moves the mandrel rearwardly out of the casing 20, permitting the transverse movement of the support 4 with the pusher and mandrel. The tube 33 is then slid on the mandrel over the free front end thereof, the enlarged front end of the mandrel providing a backing, supporting the tube when the pressure-welding rollers 30 are in operation. It is contemplated that the brackets 32 will be tack-welded to the tube before the tube is put on the mandrel. However, if desired, a jig (not shown) may be employed for holding the brackets in proper spaced relation on the tube, and in such case the tack-welding would not be necessary.

The pressure-welding rollers are moved radially inward or outward by means of the hydraulic cylinders until they are adjusted to a position suitable for pressure-welding the brackets to the tube. The support 4 is then returned transversely until the axis of the tube coincides with the axis of the housing 6. The sprockets are then actuated as by an electric motor (not shown) moving pusher 8 and sleeve 12 and consequently the tube forwardly, the tube entering the housing through the opening 31 in the casing 20. The tube must be disposed so that the brackets 32 are in line with their respective rollers as shown in Fig. 5. As pusher 8 moves forwardly, mandrel 5 must also be moved forwardly until collar 19 engages support 4. This movement of the mandrel may be made manually.

As soon as the brackets engage the rollers, the hydraulic cylinders may be actuated, if necessary, to correctly force the rollers down upon the brackets with the desired pressure. The brackets and tube must be hot, as will later be described, when the rollers start the welding operation. The sprockets keep moving the tube and brackets along until the rollers have acted upon the entire length of the brackets, welding them to the tube. The speed of the sprockets and the pressure of the rollers will be regulated to effect proper welding. It will be noted that the enlarged front end of the mandrel is positioned opposite the rollers so as to support the tube. As the rollers are arranged equally spaced around the tube, there is no tendency of the tube to move out of axial alignment with the housing 6.

The rollers weld the brackets to the tube by pressure-welding. In order to so pressure-weld, the brackets or tube, or both, must be heated to a temperature at which welding is possible. Therefore, at the moment of engagement of the brackets by the rollers, this welding temperature must be present at the portion of the tube and brackets in the housing 6. There are various methods of so heating the brackets and tube. A satisfactory method of heating is to employ a gas burner ring (not shown) surrounding the brackets and tube immediately to the rear of the casing 20. As the tube and brackets continuously move through the opening 31, the portions thereof subject to the action of the rollers will be at the proper temperature, there being no appreciable lapse of time between heating and rolling in which a harmful drop in temperature could occur. Gas burner rings for heating tubes are well known, see U. S. patent to Coberly, et al., No. 2,040,240, May 12, 1936.

When the brackets have been welded to the tube, the tube is removed from the machine through the opening 31 in the casing 21 and the machine is then ready to weld brackets on another tube.

While eight rollers have been shown in the drawing, more than this number of rollers may be employed, if desired, to simultaneously weld a larger number of brackets to a tube. For instance, if it was desired to weld sixteen brackets to a tube, the machine could be provided with another welding head immediately in front of the welding head shown in the drawing.

The pressure-welding of the brackets to the tube may cause a certain amount of scale to be formed. This may be prevented, if desired, by forming the openings 31 of casings 20 and 21 of a shape to closely fit the fin brackets and tube, and then supplying the housing 6 with an inert gas.

While there has been hereinbefore described an approved embodiment of the invention, it will be understood that many and various changes and modifications in form, arrangement of parts and details of construction thereof may be made without departing from the spirit of the invention, and that all such changes and modifications as fall within the scope of the appended claims are contemplated as a part of this invention.

The invention claimed and desired to be secured by Letters Patent is:

1. A machine for pressure-welding a fin bracket, having at least a base and a fin portion at an angle thereto, to the external surface of a tube, comprising a base; a mandrel support mounted on said machine base at one end thereof; a tube pusher slidably mounted on said machine base for longitudinal movement relative thereto; a mandrel slidably mounted in said support and pusher; means for advancing and retracting said pusher longitudinally of said machine base; means on said mandrel engaged by said pusher during its said retraction for retracting said mandrel; and a pressure-welding roller head, mounted on said machine base at the other end thereof, having a roller for pressure-welding said bracket base to said tube, and means for forcing said roller into pressure engagement with said bracket base, said mandrel being adapted for supporting said tube opposite said roller.

2. A machine for pressure-welding a fin bracket, having at least a base and a fin portion at an angle thereto, to the external surface of a tube, comprising a base; a mandrel support slidably mounted on said machine base at one end thereof for transverse movement relative thereto; a tube pusher adapted to be slidably mounted on said machine base and on said support for longitudinal movement relative thereto and for transverse movement with said support relative to said machine base; a mandrel slidably mounted in said support and pusher; means for moving said pusher longitudinally of said machine base and support; and a pressure-welding roller head, mounted on said machine base at the other end thereof, having a roller for pressure-welding said bracket base to said tube, and means for forcing said roller into pressure-engagement with said bracket base, said mandrel being adapted for supporting said tube opposite said roller.

3. A machine for simultaneously pressure-welding a plurality of fin brackets, each having at least a base and a fin portion at an angle thereto, to the external surface of a tube, comprising a base; a mandrel support slidably mounted on said machine base at one end thereof for transverse movement relative thereto; a tube pusher adapted to be slidably mounted on said machine base and on said support for longitudinal movement relative thereto and for transverse movement with said support relative to said machine base; a mandrel slidably mounted in said support and pusher; means for moving said pusher longitudinally of said machine base and support; and a pressure-welding roller head, mounted on said machine base at the other end thereof, having a plurality of rollers for simultaneously pressure-welding said bases of said brackets to said tube, and fluid-actuated cylinders for forcing said rollers into pressure engagement with said bases of said brackets, said mandrel being adapted for supporting said tube opposite said rollers.

4. A machine for pressure-welding a fin bracket, having at least a base and a fin portion at an angle thereto, to the external surface of a tube, comprising a base having a longitudinal guide; a mandrel support slidably mounted on said machine base at one end thereof for transverse movement relative thereto, having a longitudinal bearing for a mandrel and a longitudinal guide in line with said machine base guide when in active position; a tube pusher adapted to be slidably mounted on said machine base and on said support in said guides thereof for longitudinal movement relative thereto and for transverse movement with said support relative to said machine base, said pusher having a longitudinal bearing for a mandrel in line with said support bearing; a mandrel slidably mounted in said support and pusher bearings; means for moving said pusher in said guides longitudinally of said machine base and support; and a pressure-welding roller head, mounted on said machine base at the other end thereof, having a casing, a shaft journalled in said casing, an arm secured to said shaft in said casing, a roller for pressure-welding said bracket base to said tube journalled in said arm, an arm secured to said shaft externally of said casing, and a fluid-actuated cylinder having a piston connected to said external arm for forcing said roller into pressure engagement with said bracket base, said mandrel being adapted for supporting said tube opposite said roller.

5. A machine for pressure-welding fin brackets, each having at least a base and a fin portion at an angle thereto, to the external surface of a tube, said brackets being arranged oppositely disposed in pairs, comprising a base; a mandrel support mounted on said machine base at one end thereof; a tube pusher slidably mounted on said machine base for longitudinal movement relative thereto; a mandrel slidably mounted in said support and pusher; means for moving said pusher longitudinally of said machine base; and a pressure-welding roller head, mounted on said machine base at the other end thereof, having two diametrically opposed rollers for simultaneously pressure-welding said bases of a pair of said brackets to said tube, a fluid-actuated cylinder, and actuating mechanism operated by said cylinder for simultaneously swinging said rollers into pressure rolling engagement with said bases of said pair of brackets, said mandrel being adapted for supporting said tube opposite said rollers.

6. A machine for pressure welding a fin bracket, having at least a base and a fin portion at an angle thereto, to the external surface of a tube, comprising a base; tube pusher means including a pusher element and means for advancing and retracting said element longitudinally of said machine base; a mandrel slidably mounted on said machine base for longitudinal movement relative to said machine base to active and inactive positions; means on said mandrel engaged by said pusher means during said retraction for retracting said mandrel to inactive position; and a pressure-welding roller head mounted on said machine base in advance of said pusher element, having a roller for pressure-welding said bracket base to said tube, and means for forcing said roller into pressure engagement with said bracket base, said mandrel being adapted for supporting said tube opposite said roller.

NORMAN C. THOMPSON.
ADDISON Y. GUNTER.
WILBUR A. SHAW.
VIOLA B. ROE,
*Administratrix of the personal estate of Walter E. Roe, deceased.*